United States Patent Office 3,532,754
Patented Oct. 6, 1970

3,532,754
CATALYTIC DEAMINATION OF ALKYL DIAMINO-
BENZENES TO ALKYL AMINOBENZENES
Earle S. Brown, South Charleston, W. Va., assignor to
Union Carbide Corporation, a corporation of New
York
No Drawing. Filed Dec. 26, 1967, Ser. No. 693,171
Int. Cl. C07c 85/00
U.S. Cl. 260—578        8 Claims

ABSTRACT OF THE DISCLOSURE

The catalytic hydrogenation of 1-alkyl-2,3- (and 3,4-) diaminobenzenes in contact with a supported cobalt hydrogenation catalyst such as cobalt-on-kieselguhr or a mixed cobalt oxides-calcium oxide-sodium carbonate catalyst yields 1-alkyl-2- (and 3-) aminobenzenes. The alkylaminobenzenes are known compounds having known utilities.

---

This invention relates to a process for producing ortho- and meta-toluidines.

The usual reaction that occurs when an aromatic amine is reacted with hydrogen at superatomospheric pressures in the presence of a catalyst is ring hydrogenation to yield the corresponding saturated cyclohexylamine. This is the result obtained when 2,4-diaminotoluene and 2,6-diaminotoluene are hydrogenated while in contact with a base-promoted cobalt oxide catalyst. The catalytic hydrogenation of 2,4-diaminotoluene in contact with a mixture of cobalt oxide-calcium oxide-sodium carbonate yields 1-methyl-2,4-cyclohexanediamine; similarly 2,6 - diaminotoluene yields 1-methyl-2,6-cyclohexanediamine.

It was therefore quite unexpected and surprising to find that 1-alkyl-2-3,-diaminobenzenes and 1 - alkyl-3,4-diaminobenzenes and mixtures thereof did not undergo the same ring hydrogenation reaction and that under similar catalytic reaction conditions with a supported cobalt catalyst these compounds undergo a catalytic deamination reaction to yield the alkyl aromatic monoamines. This was completely unobvious and unexpected.

In the process of the instant invention 1-alkyl-2,3-diaminobenzenes (I) and 1-alkyl-3,4-diaminobenzenes (II) of the formulae:

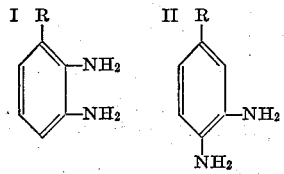

or mixtures thereof are catalytically hydrogenated under superatmospheric pressure to produce the corresponding 1-alkyl-2 (or 3-) aminobenzenes. In the above formulae R is alkyl of from 1 to about 10, or more, carbon atoms, e.g., methyl, ethyl, propyl, isopropyl, butyl, isobutyl, t-butyl, pentyl, 2 - methylbutyl, hexyl, neohexyl, 2-ethylhexyl, heptyl, octyl, 4,4-dimethyloctyl, 3-methylpentyl, 2,2-dimethylpentyl, nonyl, decyl, and the like. The alkyldiamines are obvious to one skilled in the art in view of the above description and include, for example, 1-methyl-2,3 - diaminobenzene, 1-methyl-3,4-diaminobenzene, 1-ethyl-2,3-diaminobenzene, 1 - ethyl - 3,4-diaminobenzene, 1 - propyl - 2,3 - diaminobenzene, 1-propyl-3,4-diaminobenzene, 1 - isopropyl - 2,3 - diaminobenzene, 1-isopropyl-3,4 - diaminobenzene, 1 - n - butyl-2,3-diaminobenzene, 1 - isobutyl - 2,3 - diaminobenzene, 1-t-butyl-2,3-diaminobenzene, 1 - n - butyl-3,4-diaminobenzene, 1-isobutyl-3,4-diaminobenzene, 1 - t - butyl - 3,4 - diaminobenzene, 1-pentyl - 2,3 - diaminobenzene, 1 - neopentyl-2,3-diaminobenzene, 1 - (3 - methylpentyl) - 2,3-diaminobenzene, 1-pentyl - 3,4-diaminobenzene, 1-hexyl-2,3-diaminobenzene, 1 - hexyl - 3,4 - diaminobenzene, 1 - heptyl-2,3-diaminobenzene, 1 - (4 - ethylheptyl) - 3,4 - diaminobenzene, 1-octyl - 2,3 - diaminobenzene, 1 - (2 - ethylhexyl)-2,3-diaminobenzene, 1 - (2 - ethylhexyl)-3,4-diaminobenzene, 1-nonyl - 2,3 - diaminobenzene, 1 - nonyl - 3,4 - diaminobenzene, 1 - decyl - 2,3 - diaminobenzene, 1-decyl-3,4-diaminobenzene, 1 - neodecyl-3,4-diaminobenzene, and the like.

The catalytic deamination is carried out by heating the mixture of diamines and catalyst under a pressure of hydrogen. The reaction can be carried out in the absence of an added inert organic solvent or in the presence thereof. Illustrative solvents include toluene, benzene, xylene, hexane, heptane, decane, cyclopentane, methylcyclopentane, cyclohexane, and the like; many other hydrocarbon solvents are known. The presence of a solvent is not required; however, when it is used it is preferred to select one which will not unduly interfere with the deamination process under the particular reaction conditions being employed. The amount of solvent used is likewise of no criticality.

The temperature of the reaction can vary from about 200° C. to about 250° C. or higher and it is preferably maintained at about 215° C. to 235 C. In the case of the 2,3- and 3,4-diaminotoluenes, a temperature of about 250° C. results in indiscriminant deamination to toluene, while higher temperatures cause ring hydrogenation to cyclohexane derivatives, both at high rates; however, there may be instances when this may not be objectionable.

The catalysts found useful in the instant invention are the supported cobalt hydrogenation catalysts such as cobalt-on-kieselguhr or supported on any other inert inorganic support such as alumina, silica, pumice, silica gel, silicon carbide, titania, carbon, alkaline earth sulfates and carbonates, and the like. Also included is a mixture of (i) cobalt oxides, (ii) calcium oxide, and (iii) anhydrous sodium carbonate. These catalysts are well known in the art as effective hydrogenation catalysts for aromatic amines; consequently, it was unexpected, surprising and unpredictable to find that hydrogenation did not occur but that deamination took place. The concentration of the catalyst can vary providing a catalytic amount is employed and can be from about 20 percent to about 70 percent by weight, preferably from about 30 percent to about 60 percent by weight, based on the weight of 1-alkyl-2,3- (or 3,4-) diaminobenzene charged. When the cobalt oxide/calcium oxide/anhydrous sodium carbonate catalyst is used, the catalyst mixture can vary broadly in composition and the ratio of Co:Ca:CO$_3$= can vary from about 5:75:20 to about 40:40:20; the preferred mixtures have ratios of from about 25:55:20 to about 35:45:20.

The hydrogen pressure in the reactor can be from about 1,000 p.s.i.g. to 7,500 p.s.i.g. or more, preferably from about 1,500 p.s.i.g. to about 4,500 p.s.i.g., and most preferably from about 2,500 p.s.i.g. to about 3,000 p.s.i.g. Means for the introduction of hydrogen into the reactor and the maintenance of the pressure in the reactor are known to those skilled in the art.

The following examples further serve to illustrate this invention.

EXAMPLE 1

A mixture of toluene-2,3-diamine and toluene-3,4-diamine (55% and 45% respectively, 122 g., 1 mole) was charged to a 3 liter Adkins bomb with a catalyst comprising 25 grams of technical cobalt oxide, 40 grams of calcium oxide, and 15 grams of anhydrous sodium carbonate. This mixture was heated to 225° and subjected to hydrogen at 3,000 p.s.i.g. A total of 600 p.s.i.g. hydrogen was absorbed in 4.5 hours, after which time absorption ceased. The reaction mixture resulting was fractionally distilled over a 36″ spinning band column to yield 55 g. of toluidines boiling at 94–97°/12 mm. in addition to 44 g. of recovered starting materials.

The infrared spectrum of the m-toluidine and o-toluidine mixture produced was identical with that of authentic sample of m-toluidine, showing absorption maxima at 3.03 (NH); 6.25 (C—N); 12.87 (meta-aryl substitution); 14.5 (meta-aryl substitution). The proton magnetic resonance analysis of the mixture indicated that it was 88.4% m-toluidine and 11.6% o-toluidine with a trace of p-toluidine.

The equivalent weight determined by titration with standard methanolic hydrochloric acid was 107.4 (theoretical=107).

The use of cobalt-on-silica or cobalt-on-carbon gives similar results.

EXAMPLE 2

Three identical autoclaves were charged with 10 g. of pure 3,4-diaminotoluene and 6.61 g. of catalyst comprising 31.8% cobalt oxide, 49.6% calcium oxide and 18.6% anhydrous sodium carbonate. One autoclave was heated to 225°, the second to 250° and the third to 275°. Hydrogen was injected to 1,500 p.s.i.g. into each of the autoclaves and then agitation initiated. The autoclaves were maintained at the appropriate conditions until no further hydrogen absorption occurred. They were then cooled, vented down, and discharged. The reaction mixtures were then subjected to gas chromatographic analysis on a 2-meter 5% silicon 710/chromasorb W column using an F and M 500' chromatograph. The various peaks were identified by comparison to authentic samples. The results are recorded in the following table:

| Temp., °C. | Pressure (p.s.i.g.) | Reaction time (hours) | Products | VPC area, percent |
|---|---|---|---|---|
| 225 | 1,500 | 4.0 | Toluidines | 67 |
|  |  |  | 3,4-diaminotoluene | 33 |
| 250 | 1,500 | 4.5 | Toluene | 96.3 |
|  |  |  | Toluidines | 3.7 |
|  |  |  | 3,4-diaminotoluene | Nil |
|  |  |  | Methylcyclohexane | |
|  |  |  | Methylcyclohexylamine | 1 |
| 275 | 1,500 | 1.2 | Toluene | 28 |
|  |  |  | Toluidines | 71 |
|  |  |  | 3,4-diaminotoluene | Nil |

As shown by the data, at a temperature of 225° C., there was a 67 percent conversion of the 3,4-diaminotoluene to a mixture of toluidines with 33 percent of the 3,4-diaminotoluene recovered unchanged. At 250° C., however, the yield of toluidines was only 3.7 percent with complete deamination of the starting material to toluene proceeding to the extent of 96.3 percent. At the higher temperature of 275° C., ring hydrogenation commenced after only 1.2 hours of reaction; this reaction was stopped at this stage to preclude further ring hydrogenation. The data shows that at the higher temperatures 3,4-diaminotoluene will produce the desired toluidine products if much shorter reaction periods are employed.

EXAMPLE 3

In a manner similar to that described in Example 2 a 55/45 by weight mixture of 2,3-diaminotoluene and 3,4-diaminotoluene was reacted. The results are set forth below:

| Temp., °C. | Pressure (p.s.i.g.) | Reaction time (hours) | Products | VPC area, percent |
|---|---|---|---|---|
| 225 | 1,500 | 5.25 | Toluidines | 18.7 |
|  |  |  | Diaminotoluenes | 81.3 |
| 250 | 1,500 | 3.75 | Methylcyclohexylamine | 13.9 |
|  |  |  | Toluene | 20.9 |
|  |  |  | Toluidines | 65.2 |
|  |  |  | Diaminotoluenes | Nil |
| 275 | 1,500 | 2.25 | Toluene | 7.0 |
|  |  |  | Methylcyclohexane | 8.2 |
|  |  |  | Methylcyclohexylamine | 34.8 |
|  |  |  | Toluidines | 47.5 |

This data shows that at 225° C. there is no ring hydrogenation or complete deamination; whereas at 250° C. one encounters both ring hydrogenation and complete deamination and at 275° C. extensive ring hydrogenation and complete deamination takes place.

EXAMPLE 4

A mixture of toluene-2,3-diamine and toluene-3,4-diamine (50:50; 122 g.) and 25 grams of cobalt-kieselguhr catalyst was charged to a 3 liter stainless steel rocker autoclave. The reactor was purged with hydrogen and pressured to 500 p.s.i.g. with hydrogen. The reactor was heated to 225° C. and hydrogen was injected to a total pressure of 3000 p.s.i.g. A total of 200 p.s.i.g. hydrogen drop was noted in 7 hours. The reactor was cooled to 25° C., pressure was vented off, and the reactor contents removed, filtered and fractionally distilled on a 24" spinning band column to give 49.6 grams of mixed toluidines boiling at 66–68°/10 mm. The infrared spectrum of the mixture compared with an authentic sample confirmed that it was a mixture of about equal amounts of o-toluidine and m-toluidine and a considerably smaller quantity of p-toluidine.

The equivalent weight determination gave a value of 108.6; the theoretical value is 107.

Replacing the cobalt-on-kieselguhr with cobalt-on-barium sulfate gives similar results under the above conditions.

What is claimed is:

1. A process for the production and recovery of a member of the group consisting of 1-alkyl-2-aminobenzene and 1-alkyl-3-aminobenzene, which comprises contacting at a temperature from about 200° C. to about 250° C. a member of the group consisting of 1-alkyl-2,3-diaminobenzene, 1-alkyl-3,4-diaminobenzene and mixtures thereof with a catalytic amount of a supported cobalt hydrogenation catalyst from the group of cobalt oxide supported on sodium carbonate and cobatl-kieselguhr under a superatmospheric pressure of hydrogen, wherein the alkyl group contains from 1 to about 10 carbon atoms.

2. A process as claimed in claim 1, wherein the catalyst is a catalyst mixture of cobalt oxides, calcium oxide and sodium carbonate.

3. A process as claimed in claim 1, wherein the catalyst is cobalt-on-kieselguhr.

4. A process as claimed in claim 1, wherein the pressure is from about 1,000 p.s.i.g. to about 7,500 p.s.i.g.

5. A process as claimed in claim 2, wherein the Co:Ca:CO$_3$= ratio in the catalyst is from about 5:75:20 to about 40:40:20.

6. A process as claimed in claim 4, wherein the catalyst concentration is from about 20 to 70 percent by weight based on the weight of starting diaminobenzene compound charged.

7. A process as claimed in claim 1, wherein the starting material is toluene-3,4-diamine and the product is primarily m-toluidine.

8. A process as claimed in claim 1, wherein the starting material is a mixture of toluene-2,3-diamine and toluene-3,4-diamine and the product is primarily a mixture of o-toluidine and m-toluidine.

References Cited

Jackson et al., Journal of the Chemical Society, 1962, pp. 3746–3751.

CHARLES B. PARKER, Primary Examiner

R. L. RAYMOND, Assistant Examiner